United States Patent
Yamaguchi

(10) Patent No.: US 9,951,429 B2
(45) Date of Patent: Apr. 24, 2018

(54) SEMICONDUCTOR PHOTOCATALYST AND ARTIFICIAL PHOTONIC SYNTHESIS DEVICE HAVING THE SAME

(71) Applicant: DENSO CORPORATION, Kariya, Aichi-pref. (JP)

(72) Inventor: Hitoshi Yamaguchi, Nisshin (JP)

(73) Assignee: DENSO CORPORATION, Kariya (JP)

( * ) Notice: Subject to any disclaimer, the term of this patent is extended or adjusted under 35 U.S.C. 154(b) by 356 days.

(21) Appl. No.: 14/748,399

(22) Filed: Jun. 24, 2015

(65) Prior Publication Data

US 2016/0032462 A1 Feb. 4, 2016

(30) Foreign Application Priority Data

Aug. 1, 2014 (JP) ................. 2014-157892

(51) Int. Cl.
| | |
|---|---|
| C25B 1/00 | (2006.01) |
| C25B 1/04 | (2006.01) |
| C25B 9/08 | (2006.01) |
| C25B 11/04 | (2006.01) |

(Continued)

(52) U.S. Cl.
CPC ............. C25B 1/003 (2013.01); C25B 1/04 (2013.01); C25B 9/08 (2013.01); C25B 11/0405 (2013.01); C25B 11/0421 (2013.01); C25B 11/0447 (2013.01); C25B 13/04 (2013.01); H01G 9/2045 (2013.01); Y02E 60/364 (2013.01); Y02E 60/368 (2013.01)

(58) Field of Classification Search
CPC .. C25B 1/003; C25B 1/04; C25B 9/08; C25B 11/0405; C25B 11/0421; C25B 11/0447; C25B 13/04; H01G 9/2045; Y02E 60/364; Y02E 60/368
See application file for complete search history.

(56) References Cited

U.S. PATENT DOCUMENTS

| | | | |
|---|---|---|---|
| 2008/0314447 A1 | 12/2008 | Walukiewicz et al. | |
| 2011/0005590 A1* | 1/2011 | Walukiewicz | .......... C25B 1/003 136/256 |

(Continued)

FOREIGN PATENT DOCUMENTS

| | | |
|---|---|---|
| JP | S62-068547 A | 3/1987 |
| JP | 2005-199187 A | 7/2005 |
| JP | 2013-049891 A | 3/2013 |

(Continued)

*Primary Examiner* — Ciel P Thomas
(74) *Attorney, Agent, or Firm* — POSZ Law Group, PLC

(57) ABSTRACT

A semiconductor photocatalyst includes first and second layers made of first and second materials, respectively. Band gaps of the first and second materials are equal to or smaller than 1.5 eV and 2.5 eV, respectively. A lower electric potential of a conduction band of the second material is disposed on a positive side from the first material. An upper electric potential of a valence band of the second material is disposed on a positive side from the first material and from an oxidation electric potential of water when the first and second layers are bonded to each other in the hetero junction manner. The lower electric potential of the conduction band of the first layer is disposed on a negative side from a reduction electric potential of hydrogen when the first and second layers are bonded to each other in the hetero junction manner.

14 Claims, 9 Drawing Sheets

(51) Int. Cl.
*C25B 13/04* (2006.01)
*H01G 9/20* (2006.01)

(56) References Cited

U.S. PATENT DOCUMENTS

| | | |
|---|---|---|
| 2012/0156578 A1 | 6/2012 | Taniguchi |
| 2012/0222967 A1* | 9/2012 | Oakes .................... C25B 1/003 |
| | | 205/637 |

FOREIGN PATENT DOCUMENTS

| | | |
|---|---|---|
| WO | 2012/137240 A1 | 10/2012 |
| WO | 2011/121932 A1 | 7/2013 |

* cited by examiner

SEMICONDUCTOR PHOTOCATALYST AND ARTIFICIAL PHOTONIC SYNTHESIS DEVICE HAVING THE SAME

CROSS REFERENCE TO RELATED APPLICATIONS

This application is based on Japanese Patent Application No. 2014-157892 filed on Aug. 1, 2014, the disclosure of which is incorporated herein by reference.

TECHNICAL FIELD

The present disclosure relates to a semiconductor photocatalyst for photonic synthesizing artificially and an artificial photonic synthesis device having the semiconductor photocatalyst.

BACKGROUND

When a plant photosynthesizes, the plant utilizes optical energy such as solar light so that the plant generates carbon hydride compounds such as glucose (i.e., $C_6H_{12}O_6$) including hydrogen and carbon in addition to oxygen (i.e., $O_2$) from water (i.e., $H_2O$) and carbon oxide (i.e., $CO_2$) absorbed in the plant. A system has been studied such that the photonic synthesis is artificially performed using semiconductor photocatalyst, hydrogen ($H_2$) and oxygen are generated from water using optical energy of the solar light, generated hydrogen is stored, and the stored hydrogen is used by a fuel cell to generate electricity so that electric energy is retrieved if necessary.

For example, as shown in FIG. 11, the semiconductor photocatalysts J2, J3 for providing the anode electrode and the cathode electrode are arranged in a casing J1. Thus, the sun light is irradiated so that the optical energy is supplied. Thus, a reaction shown in chemical equation E1 occurs at the semiconductor photocatalyst J2 as the anode electrode, and a reaction shown in chemical equation E2 occurs at the semiconductor photocatalyst J3 as the cathode electrode. Thus, the hydrogen and oxygen are generated. Here, the term "h" in the chemical equation 1 represents a hole, and the term "e" represents an electron.

$$2H_2O + 4h^+ \rightarrow O_2 + 4H^+ + 2e^- \quad (E1)$$

$$4H^+ + 2e^- \rightarrow H_2 \quad (E2)$$

Specifically, a titanium dioxide electrode (i.e., $TiO_2$ electrode) and a platinum electrode (i.e., Pt electrode) as the semiconductor photocatalysts J2, J3 are located in water. When the light is irradiated on the titanium dioxide electrode, water is decomposed so that the oxygen is generated at the titanium dioxide electrode, and the hydrogen is generated at the platinum electrode. Further, current flows between the titanium dioxide electrode and the platinum electrode. These are defined as Honda-Fujishima effect.

Since water is generated when a fuel battery generates electricity, it is possible to provide a recycling-oriented regenerative energy generating system using water and sun light without fossil fuel by recycling water into artificial photonic synthesis. Further, fuel may be synthesized by absorbing carbon dioxide ($CO_2$).

However, in the artificial photo synthesis provided by the Honda-Fujiyama effect, the efficiency of the photo synthesis is not high because the titanium dioxide can absorb only ultra-violet light in the sun light.

It is necessary to satisfy the following three conditions in order to perform the artificial photonic synthesis with high efficiency. The three conditions will be explained with reference to FIGS. 12 to 14.

The first condition is such that the light energy is absorbed in a visible light range. FIG. 12 shows an energy band view of a general semiconductor. A band gap in FIG. 12 is defined as a difference of an energy level between an upper level of a valence band and a lower level of a conduction band. The absorption of the sun light depends on the band gap. Specifically, only the light energy equal to or higher than the band gap of the semiconductor is absorbed. For example, the relationship between the wavelength of the sun light and the light intensity is shown in FIG. 13. Here, the wavelength range of the visible light is in a range between 400 nm and 800 nm. The band gap of the titanium dioxide is 3.2 eV. Thus, only the light energy is absorbed in the wavelength range equal to or shorter than 400 nm, which generates the light energy corresponding to the band gap of 3.2 eV. The energy density of the light energy is high in the visible light range. Since the titanium dioxide cannot absorb the light energy having the visible light range, the efficiency of the photonic synthesis is not high. Thus, when the light energy is effectively absorbed in the visible light range, it is necessary to narrow the band gap, and this is the first condition.

The second and third conditions are such that requirements for generating oxygen and hydrogen from water are satisfied. As shown in FIG. 14, the oxidation electric potential of water required for generating oxygen by oxidizing water using a hole is 1.23 V with reference to the standard hydrogen electrode electric potential (i.e., SHE) as a standard. Unless the electric potential (i.e., an upper band energy level) of the upper level of the valence band is disposed on a positive side (i.e., a lower side) from the oxidization electric potential of water, the oxygen is not generated from water using the hole. Further, as shown in FIG. 14, the hydrogen reduction electric potential required for generating hydrogen by reducing the hydrogen ion using the electron is 0 V. Unless the electric potential (i.e., a lower band energy level) of the lower level of the conduction band is disposed on the negative side (i.e., the upper side) from the hydrogen reduction electric potential, the hydrogen is not generated using the electron. In order to satisfy both conditions, it is necessary to have a large band gap.

Thus, the first condition is opposite to the second and third conditions. In order to perform the photonic synthesis effectively, it is important to valance these conditions.

Alternatively, the artificial photonic synthesis, which is different from the synthesis provided by the Honda-Fujishima effect, may be performed using the semiconductor photocatalyst. For example, the semiconductor photocatalyst is proposed in Patent document No. 1 such that the anode electrode has a structure that an aluminum gallium nitride layer (i.e., AlGaN layer) is arranged on a gallium nitride layer (i.e., GaN layer), and the cathode electrode is made of metallic material including platinum mainly.

Further, another semiconductor photocatalyst is proposed in Patent document No. 2 such that water absorption and water oxidation (for generating oxygen) are performed using tungsten oxide (WO3) and bismuth vanadate ($BiVO_4$), and the light absorption and the hydrogen reduction (for generating hydrogen) are performed using $PT/SrTiO_3$. Specifically, generation of oxygen and generation of hydrogen are performed using different materials in two steps. Two reactions are continuously performed using electron transmission material.

However, the semiconductor photocatalyst described in the Patent document No. 1 provides to satisfy the requirement for the oxidation electric potential of water and the reduction electric potential of hydrogen, but the photocatalyst can absorb only the light having the wavelength equal to or shorter than 350 nm, so that the light energy equal to or less than a few percent of the sun light is absorbed.

On the other hand, in case of the semiconductor catalyst for performing the generation of oxygen and the generation of hydrogen using different materials in two steps, the requirements for the oxidation electric potential of water and for the reduction electric potential of hydrogen are satisfied using different materials, and further, it is possible to narrow the band gap of each material. Thus, the absorption efficiency of the light energy is improved. However, it is necessary to arrange $Fe^{2+}$ and $Fe^{3+}$ in order to continuously perform each reaction, and the wavelength of the light, which can be absorbed, is equal to or shorter than 500 nm. Although the wavelength range of the light to be absorbed is expanded, only 20% of the light energy of the sun light is absorbed.

Patent document No. 1: JP-2013-49891 A
Patent document No. 2: JP-2005-199187 A

SUMMARY

It is an object of the present disclosure to provide a semiconductor photocatalyst for absorbing light energy efficiently. It is another object of the present disclosure to provide an artificial photonic synthesis device having a semiconductor photocatalyst.

According to a first aspect of the present disclosure, a semiconductor photocatalyst includes: a first layer made of a first material having a band gap equal to or smaller than 1.5 eV; and a second layer made of a second material having a band gap equal to or smaller than 2.5 eV. The band gap of the second material is larger than the first material. A lower electric potential of a conduction band of the second material is disposed on a positive side from a lower electric potential of a conduction band of the first material. An upper electric potential of a valence band of the second material is disposed on a positive side from an upper electric potential of a valence band of the first material. The first layer and the second layer are bonded to each other in a hetero junction manner. The upper electric potential of the valence band of the second layer is disposed on a positive side from an oxidation electric potential of water under a condition that the first layer and the second layer are bonded to each other in the hetero junction manner. The lower electric potential of the conduction band of the first layer is disposed on a negative side from a reduction electric potential of hydrogen under a condition that the first layer and the second layer are bonded to each other in the hetero junction manner.

In the above semiconductor photocatalyst, the first layer and the second layer are bonded to each other in the hetero junction manner so that the semiconductor photocatalyst is formed. Thus, since the gapd gap of the first layer is different from the second layer, the sun light is effectively absorbed in a wide wavelength range. Thus, the semiconductor photocatalyst can absorb the optical energy effectively.

According to a second aspect of the present disclosure, an artificial photonic synthesis device includes: a semiconductor photocatalyst; and a casing that accommodates water, in which the semiconductor photocatalyst is dipped. The semiconductor photocatalyst includes: a first layer made of a first material having a band gap equal to or smaller than 1.5 eV; and a second layer made of a second material having a band gap equal to or smaller than 2.5 eV. The band gap of the second material is larger than the first material. A lower electric potential of a conduction band of the second material is disposed on a positive side from a lower electric potential of a conduction band of the first material. An upper electric potential of a valence band of the second material is disposed on a positive side from an upper electric potential of a valence band of the first material. The first layer and the second layer are bonded to each other in a hetero junction manner. The upper electric potential of the valence band of the second layer is disposed on a positive side from an oxidation electric potential of water under a condition that the first layer and the second layer are bonded to each other in the hetero junction manner. The lower electric potential of the conduction band of the first layer is disposed on a negative side from a reduction electric potential of hydrogen under a condition that the first layer and the second layer are bonded to each other in the hetero junction manner. When a sun light is irradiated on the semiconductor photocatalyst from a second layer side, the photocatalyst promotes to produce oxygen and hydrogen using the water, or produce carbon hydride using the water and carbon dioxide.

In the above artificial photonic synthesis device, the first layer and the second layer are bonded to each other in the hetero junction manner so that the semiconductor photocatalyst is formed. Thus, since the gapd gap of the first layer is different from the second layer, the sun light is effectively absorbed in a wide wavelength range. Thus, the artificial photonic synthesis device can absorb the optical energy effectively.

According to a third aspect of the present disclosure, an artificial photonic synthesis device includes: a semiconductor photocatalyst; a casing that accommodates water, in which the semiconductor photocatalyst is dipped; an anode electrode including the first layer and the second layer, which are arranged in the semiconductor photocatalyst; a cathode electrode electrically connected to the first layer in the anode electrode; a wiring electrically connecting the anode electrode and the cathode electrode; and an electrolyte film that partitions the casing into a first casing and a second casing. The semiconductor photocatalyst includes: a first layer made of a first material having a band gap equal to or smaller than 1.5 eV; and a second layer made of a second material having a band gap equal to or smaller than 2.5 eV. The band gap of the second material is larger than the first material. A lower electric potential of a conduction band of the second material is disposed on a positive side from a lower electric potential of a conduction band of the first material. An upper electric potential of a valence band of the second material is disposed on a positive side from an upper electric potential of a valence band of the first material. The first layer and the second layer are bonded to each other in a hetero junction manner. The upper electric potential of the valence band of the second layer is disposed on a positive side from an oxidation electric potential of water under a condition that the first layer and the second layer are bonded to each other in the hetero junction manner. The lower electric potential of the conduction band of the first layer is disposed on a negative side from a reduction electric potential of hydrogen under a condition that the first layer and the second layer are bonded to each other in the hetero junction manner. When a sun light is irradiated on the semiconductor photocatalyst from a second layer side, the photocatalyst promotes to produce oxygen and hydrogen using the water, or produce carbon hydride using the water and carbon dioxide. The first layer includes a N conductive type layer and a P conductive type layer, which provide a PN junction.

The P conductive type layer is disposed on a second layer side. The N conductive type layer is disposed on a side opposite to the second layer side. The first layer includes a N conductive type layer and a P conductive type layer, which provide a PN junction. The P conductive type layer is disposed on a second layer side. The N conductive type layer is disposed on a side opposite to the second layer side. The first casing accommodates the anode electrode. The second casing accommodates the cathode electrode. When a sun light is irradiated on the anode electrode from a second layer side, the oxygen is produced on the anode electrode using the water, and at least one of the hydrogen or the carbon hydride is produced on the cathode electrode using the water and carbon dioxide.

In the above artificial photonic synthesis device, the first layer and the second layer are bonded to each other in the hetero junction manner so that the semiconductor photocatalyst is formed. Thus, since the gapd gap of the first layer is different from the second layer, the sun light is effectively absorbed in a wide wavelength range. Thus, the artificial photonic synthesis device can absorb the optical energy effectively.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

A semiconductor photocatalyst and an artificial photonic synthesis device having the semiconductor photocatalyst according to a first embodiment of the present disclosure will be explained. The semiconductor photocatalyst according to the present embodiment generates oxygen and hydrogen when the sun light is irradiated on the photocatalyst.

Figure 1:
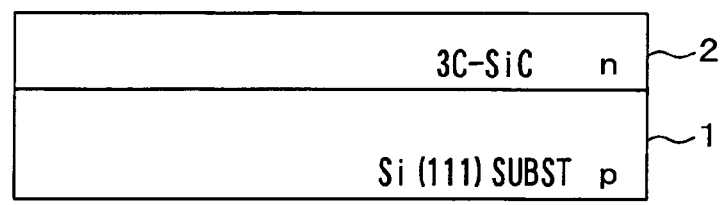
FIG. 1 is a diagram showing a cross sectional view of a semiconductor photocatalyst according to a first embodiment.

As shown in FIG. 1, the semiconductor photocatalyst has a tandem structure such that the 3C—SiC layer 2 is formed on the silicon layer 1, and the crystal structure of the 3C—SiC layer 2 is 3C silicon carbide structure (i.e., made of 3C—SiC). The silicon layer 1 is made of P conductive type silicon single crystal having a thickness of 600 micrometers and a (111) surface. The band gap of the silicon single crystal is equal to or lower than 1.5 eV. In this embodiment, the band gap of the silicon single crystal is 1.1 eV, which is comparatively narrow. Thus, the silicon layer 1 can absorb the optical energy of the light having the wavelength equal to or smaller than 1000 nm. The 3C—SiC layer 2 is made of N conductive type SiC and formed on the silicon layer 1 by a hetero epitaxial growth manner. The band gap of the N conductive type SiC is equal to or smaller than 2.5 eV. Specifically, in the present embodiment, the band gap of the N conductive type SiC is 2.2 eV. Thus, the 3C—SiC layer 2 can absorb the optical energy of the light having the wavelength equal to or lower than 600 nm.

Thus, the semiconductor photocatalyst is prepared by bonding the P-type silicon layer 1 and the N-type 3C—SiC layer 2, which provide a tunnel diode with a hetero junction. Thus, since two types of materials having different band gaps are used, the sun light having the wavelength in a wide range is effectively absorbed.

The hetero junction between the P-type silicon layer 1 and the N-type 3C—SiC layer 2 is formed in order to utilize the lower level of the electric potential (i.e., lower electric potential or lower band energy level) of silicon required for generating hydrogen and the upper level of the electric potential (i.e., upper electric potential or upper band energy level) of 3C—SiC required for generating oxygen. Further, the thickness of the 3C—SiC layer 2 as a region, in which the hole having a comparatively short diffusion length is displaced, is reduced (i.e., thinned), and the 3C—SiC layer 2 is formed on a principal surface. The thickness of the silicon layer 1 as a region, in which the electron is displaced, is increased (i.e., thickened), and the silicon layer 1 is formed on a backside surface.

Figure 2:
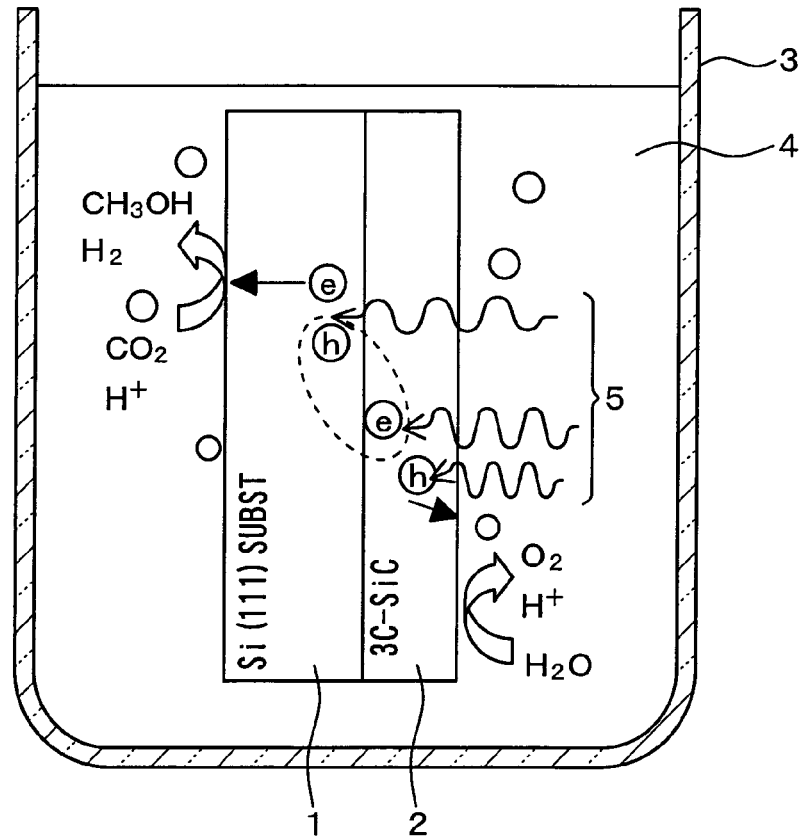
FIG. 2 is a diagram showing a cross sectional view of an artificial photonic synthesis device having the semiconductor photocatalyst in FIG. 1.

The semiconductor photocatalyst having the silicon layer 1 and the 3C—SiC layer 2 is mounted in the artificial photonic synthesis device shown in FIG. 2. Specifically, the semiconductor photocatalyst is used under a condition that the photocatalyst is dipped into water 4, which is accommodated in a casing 3. When the sun light 5 is irradiated from the 3C—SiC layer side, the photocatalyst generates oxygen and hydrogen. Specifically, according to the optical energy of the sun light 5, oxygen is generated on the 3C—SiC layer side, and hydrogen is generated on the silicon layer side.

Figure 3:
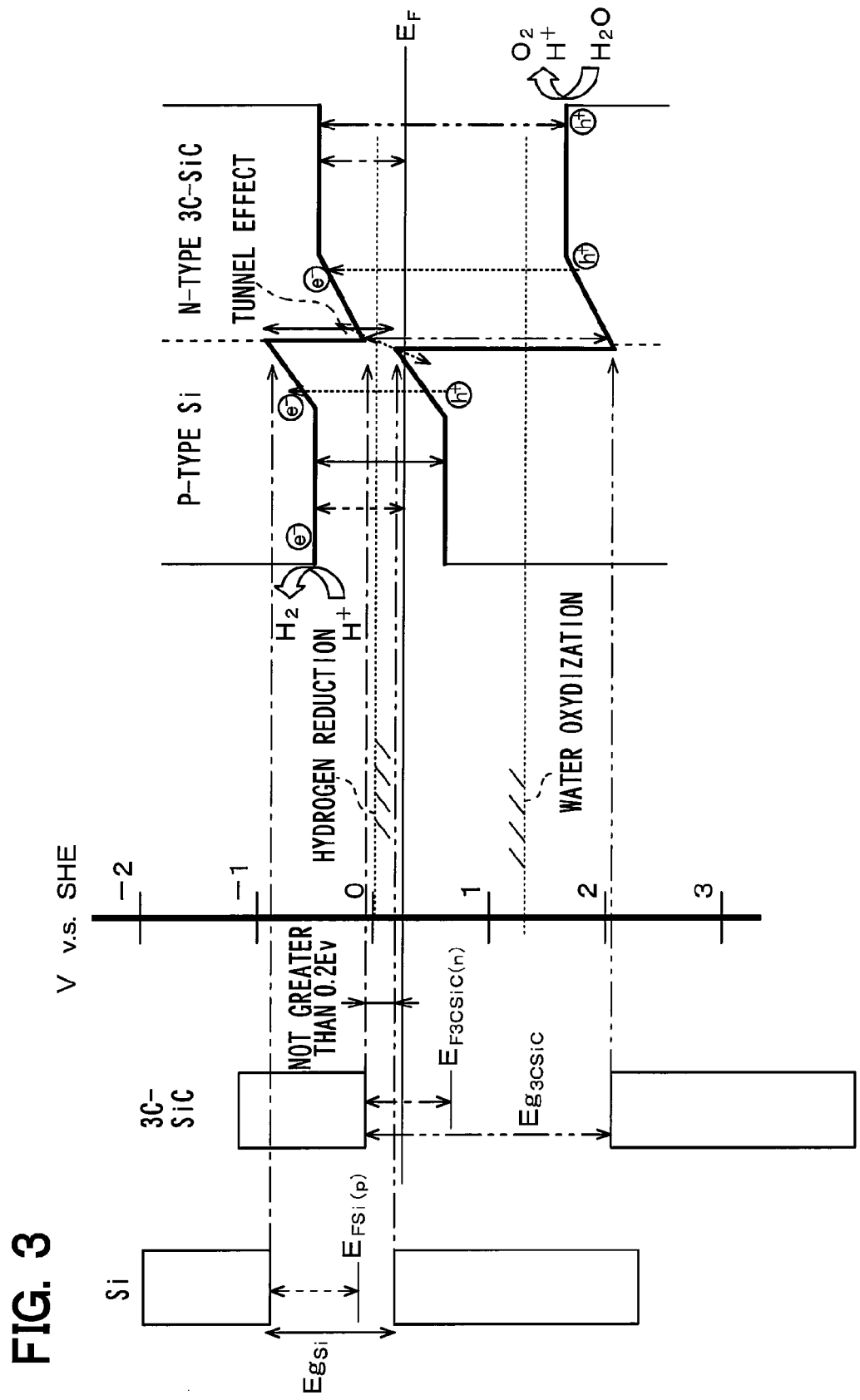
FIG. 3 is a diagram showing, with respect to the semiconductor photocatalyst in FIG. 1, an electric potential, an oxidation electric potential of water and a hydrogen reduction electric potential measured on the basis of the standard hydrogen electrode, an energy band structure of each of the silicon layer and a 3C—SiC layer, and an energy band structure in a case where the silicon layer and the 3C—SiC layer are bonded with a hetero junction.

FIG. 3 shows an electric potential, an oxidation electric potential of water and a hydrogen reduction electric potential measured on the basis of the standard hydrogen electrode, an energy band structure of each of the silicon layer and a 3C—SiC layer, and an energy band structure in a case where the silicon layer and the 3C—SiC layer are bonded with a hetero junction. In FIG. 3, the term "$Eg_{Si}$" represents a band gap of silicon. The term "$Eg3_{CSiC}$" represents a band gap of 3C—SiC. The term "$E_{FSi(p)}$" represents a Fermi level of P-type silicon. The term "$E_{F3CSiC(n)}$" represents a Fermi level of N-type 3C—SiC. In FIG. 3, differences between the lower level of the conduction band and each of the band gap of silicon, the band gap of 3C—SiC, the Fermi level of P-type silicon, and the Fermi level of 3C—SiC are shown as different types of arrows. In the energy band structure of the hetero junction portion shown on the right side in FIG. 3, a difference having the same as the above described difference is shown as the same type of arrow.

As shown in FIG. 3, the lower level of the conduction band on the silicon layer side of the hetero junction is disposed on a negative side from the electric potential required for generating the hydrogen. The upper level of the valence band on the 3C—SiC layer side of the hetero junction is disposed on a positive side from the electric potential required for generating the oxygen. Specifically, according to the conductive types of the silicon layer 1 and the 3C—SiC layer 2 and the adjustment of the impurity concentration, the lower level of the conduction band on the silicon layer side of the hetero junction and the upper level of the valence band on the 3C—SiC layer side of the hetero junction are determined.

Further, in order to continuously turn over the electron and the hole excited on the silicon layer side to the electron and the hole excited on the 3C—SiC layer side, the energy level difference between the conduction band of the 3C—SiC layer 2 and the valence band of the silicon layer 1 is set to be 0.2 eV or less. Thus, the energy level difference between the lower level of the conduction band in the material of 3C—SiC as independent material shown in the energy band structure of each material on the left side of FIG. 3 and the upper level of the valence band in the material of silicon as independent material is set to be equal to or smaller than 0.2 eV. Thus, since the energy level difference between the lower level of the conduction band in the 3C—SiC layer 2 and the upper level of the valence band in the silicon layer 1 is set to be equal to or smaller than 0.2 eV, and further, the thickness of the transition region of the hetero junction is thinned, the tunnel phenomenon occurs, and the tunnel current flows.

Further, the band structure is bent to displace the electron in a pair of the electron and the hole generated in the 3C—SiC layer 2 to the hetero junction side, and to displace the hole in the pair to the surface side opposite to the hetero junction. Thus, the band structure on the conduction band side of the 3C—SiC layer is bent so as to slant downward toward the hetero junction side. The band structure of the valence band side is bent so as to slant downward toward the hetero junction side. Similarly, the band structure is bent to displace the electron in a pair of the electron and the hole generated in the silicon layer 1 to the backside opposite to the hetero junction side, and to displace the hole in the pair to the hetero junction side. Thus, the band structure on the conduction band side of the silicon layer 1 is bent so as to slant upward toward the hetero junction side. The band structure of the valence band side is bent so as to slant upward toward the hetero junction side.

Thus, the electron on the conduction band side is easily displaced to the backside of the silicon layer 1, and the hole on the valence band side is easily displaced to the surface of the 3C—SiC layer 2, so that the electron and the hole are moved away from each other. Thus, since carriers are separated from each other, it is possible to restrict the recoupling. Further, the electron on the 3C—SiC layer side and the hole on the silicon layer side gather at the hetero junction, so that the tunneling phenomenon easily occurs according to the recoupling.

Further, the impurity concentration of the P conductive type impurity in the silicon layer 1 is an element for determining the bending structure of the band structure and the lower level of the conduction band of electron. Similarly, the impurity concentration of the N conductive type impurity in the 3C—SiC layer 2 is an element for determining the upper level of the valence band of hole and the bending structure of the band structure. Accordingly, the impurity concentration of the silicon layer 1 and the impurity concentration of the 3C—SiC layer 2 are appropriately determined so as to satisfy the generating conditions of the oxygen and the hydrogen.

Thus, the semiconductor photocatalyst and the artificial photonic synthesis device having the semiconductor photocatalyst according to the present embodiment are configured. Next, the functions of the artificial photonic synthesis device having the semiconductor photocatalyst according to the present embodiment will be explained as follows.

As described above, the semiconductor photocatalyst is used under a condition that the semiconductor photocatalyst is dipped in the water 4 accommodated in the casing 3 of the artificial photonic synthesis device. When the sun light is irradiated from the 3C—SiC layer side, the semiconductor photocatalyst provides the artificial photonic synthesis. The sun light has a short wavelength equal to or shorter than 600 nm and a long wavelength equal to or longer than 600 nm. As shown as broken lines in FIG. 3, the sun light has various components with different wavelengths. However, in the present embodiment, the tandem structure is prepared from silicon having a band gap of 1.1 eV, which is narrower, and 3C—SiC having a band gap of 2.2 eV, which is wider. Thus, the optical energy of the wavelength equal to or shorter than 1000 nm is absorbed by silicon, and the optical energy of the wavelength equal to or shorter than 600 nm is absorbed by 3C—SiC.

Further, when the sun light is irradiated and the optical energy is absorbed, the light absorbed on the 3C—SiC layer side excites a pair of the electron and the hole, and the electron is displaced to the hetero junction side and the hole is displaced to the surface side opposite to the hetero junction because of the band bending. Similarly, the light absorbed on the silicon layer side excites a pair of the electron and the hole, and the hole is displaced to the hetero junction side and the electron is displaced to the backside opposite to the hetero junction because of the band bending. The electron gathered at the hetero junction on the 3C—SiC layer side and the hole gathered at the hetero junction on the silicon layer side are re-coupled by the tunnel phenomenon. Thus, two-step excitations on the 3C—SiC layer side and the silicon layer side are continuously linked.

Further, the hole having the energy capable of oxidizing the water gathers on the surface of the 3C—SiC layer 2. Thus, the water is oxidized, i.e., the oxygen is generated and the hydrogen ion is generated. Similarly, the hydrogen is generated on the backside of the silicon layer 1 by reducing the hydrogen ion, which is generated on the 3C—SiC layer side. Further, when the carbon dioxide (i.e., $CO_2$) is bubbled, the carbon dioxide is reduced so that the carbon hydride is synthesized.

When the above reactions are continuously repeated, the oxygen and the hydrogen are generated. The above features are provided by absorbing the optical energy of the sun light in a wide wavelength range, and therefore, the oxygen and the hydrogen are generated effectively. Further, the upper electric potential of the valence band in the 3C—SiC is disposed on a positive side from the oxidization electric potential of the water, and further, the lower level of the conduction band of the silicon is disposed on a negative side from the hydrogen reduction electric potential. Thus, the oxygen is generated from the water using the hole, and the hydrogen is generated from the water using the electron. Accordingly, the band gap is narrowed so that the optical energy is effectively absorbed, and the oxygen and the hydrogen are surely generated in the semiconductor photocatalyst. Specifically, the wavelength of the sun light to be absorbed is expanded to 900 nm while the condition for the oxidation electric potential of the water and the condition for the hydrogen reduction electric potential are satisfied.

Further, the 3C—SiC layer 2 is formed on the silicon single crystal having the (111)-plane orientation by the hetero epitaxial growth method, which is different from a case where the SiC has other crystal structure such as 4H—SiC and 6H—SiC. Accordingly, the 3C—SiC layer 2 is formed on the silicon layer 1 by a conventional manufacturing method with a low cost.

Here, the semiconductor photocatalyst may be provided by arranging the 3C—SiC layer 2 on the silicon layer 1. Alternatively, a catalyst promoting material may be added on the backside of the silicon layer 1 and/or the surface of the 3C—SiC layer 2. For example, nickel (i.e., Ni) oxide, rhodium (Rh) oxide, ruthenium (Ru) oxide, cobalt (Co) oxide, iridium (Ir) oxide, or platinum (Pt) may be used as the catalyst promoting material (i.e., catalyst accelerating material). In this case, the optical energy is much effectively absorbed so that the hydrogen and the oxygen are generated.

Second Embodiment

A second embodiment will be explained as follows. In the present embodiment, the hydrogen and the oxygen are generated separately.

Figure 4:
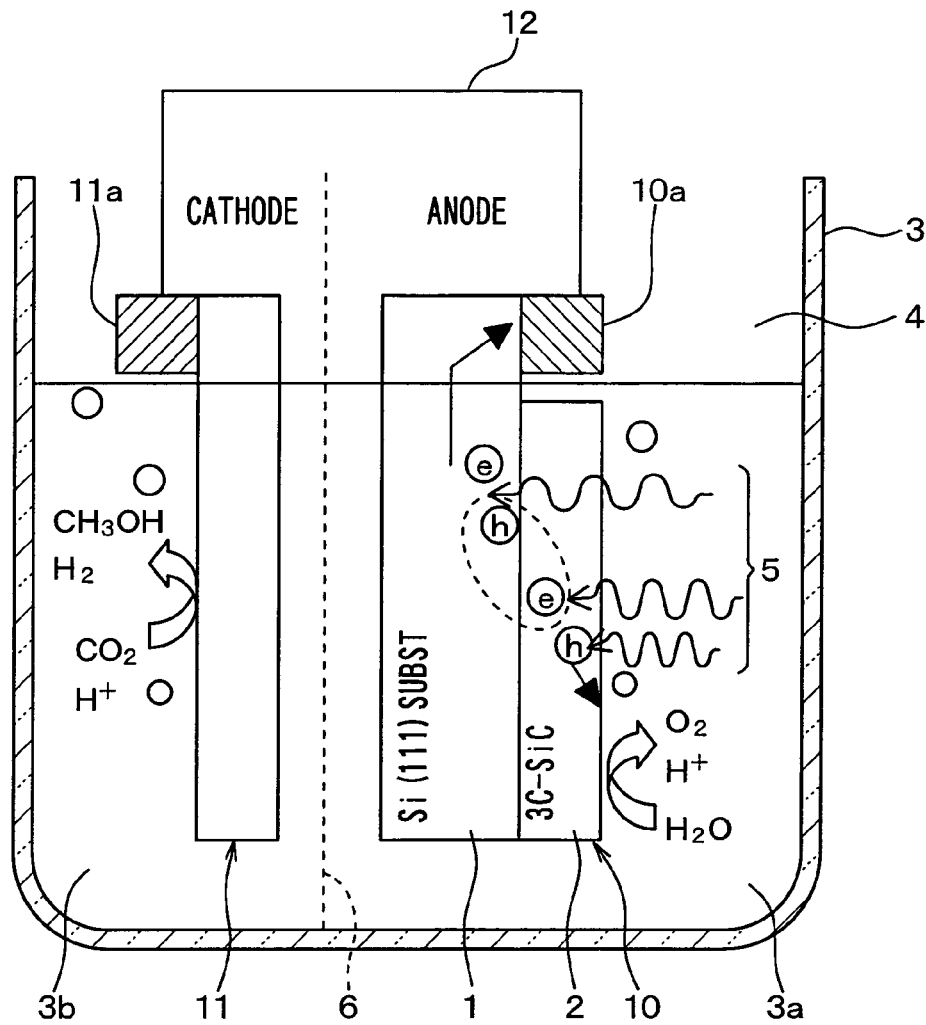
FIG. 4 is a diagram showing a cross sectional view of an artificial photonic synthesis device according to a second embodiment.

As shown in FIG. 4, in the present embodiment, the anode electrode 10 is prepared from a structure having the silicon layer 1 and the 3C—SiC layer 2 according to the first embodiment. The cathode electrode 11 as an antipole is arranged. Thus, the anode electrode 10 and the cathode electrode 11 are separately prepared, so that the produced oxygen and the produced hydrogen are discharged at different and separated places, respectively.

Specifically, the anode electrode 10 has a structure such that the 3C—SiC layer 2 is deposited on the silicon layer 1. A part of the surface of the silicon layer 1 on the 3C—SiC layer side is exposed. The pad 10a is formed on an exposed part of the silicon layer 1. The cathode electrode 11 is made of platinum (i.e., Pt), copper (Cu), titanium dioxide ($TiO_2$) or tantalum oxide nitride (TaNO). The pad 11a is arranged on one end of the anode electrode 10. The anode electrode 10 and the cathode electrode 11 are electrically connected to each other by coupling the pads 10a, 11a with the wiring 12. Thus, the semiconductor photocatalyst is prepared.

The casing 3 of the artificial photonic synthesis device is partitioned by an electrolyte film 6 made of nafion (registered trademark) into a first casing 3a and a second casing 3b. The anode electrode 10 is arranged in the first casing 3a, and the cathode electrode 11 is arranged in the second casing 3b.

Thus, the semiconductor photocatalyst and the artificial photonic synthesis device having the semiconductor photocatalyst according to the present embodiment are prepared. Next, the operation of the artificial photonic synthesis device having the semiconductor photocatalyst will be explained.

As described above, the semiconductor photocatalyst is used under a condition that the photocatalyst is arranged in the water 4 accommodated in the casing 3 of the artificial photonic synthesis device. When the sun light is irradiated from the 3C—SiC layer side, the artificial photonic synthesis is performed. Specifically, the anode electrode 10 is located on the first casing side. The cathode electrode 11 is located on the second casing side. When the sun light is irradiated on the anode electrode 10 from the 3C—SiC layer side, the device executes the photonic synthesis. The sun light has the short wavelength equal to or shorter than 600 nm, and the long wavelength equal to or longer than 600 nm. As shown as broken line arrows in FIG. 4, the sun light has various components with various wavelengths. However, in the present embodiment, the device has a tandem structure of the silicon having the band gap of 1.1 eV, which is comparatively narrow, and the 3C—SiC having the band gap of 2.2 eV, which is comparatively wide. Thus, the silicon absorbs the optical energy in the wavelength range equal to or shorter than 1000 nm. The 3C—SiC absorbs the optical energy in the wavelength range equal to or shorter than 600 nm.

Further, when the optical energy is absorbed by the irradiation of the sun light, a pair of the electron and the hole is excited by the light absorbed from the 3C—SiC layer side. The band structure is bent to displace the electron to the hetero junction side, and to displace the hole to the surface side opposite to the hetero junction. Similarly, a pair of the electron and the hole is excited by the light absorbed from the silicon layer side. The band structure is bent to displace the electron to the backside opposite to the hetero junction side, and to displace the hole to the hetero junction side. The electron gathered at the hetero junction on the 3C—SiC layer side and the hole gathered at the hetero junction on the silicon layer side are re-coupled by the tunnel phenomenon. Thus, two-step excitations on the 3C—SiC layer side and the silicon layer side are continuously linked.

Further, the hole having the energy capable of oxidizing the water gathers on the surface of the 3C—SiC layer 2. Thus, the water is oxidized, i.e., the oxygen is generated and the hydrogen ion is generated.

On the other hand, the electron excited on the silicon layer 1 is transferred to the cathode electrode side via the wiring 12. The hydrogen is generated on the cathode electrode side by reducing the hydrogen ion, which is generated on the 3C—SiC layer side. Further, when the carbon dioxide (i.e., $CO_2$) is bubbled, the carbon dioxide is reduced so that the carbon hydride is synthesized.

When the above reactions are continuously repeated, the oxygen and the hydrogen are generated. The above features are provided by absorbing the optical energy of the sun light in a wide wavelength range, and therefore, the oxygen and the hydrogen are generated effectively. Further, the upper electric potential of the valence band in the 3C—SiC is disposed on a positive side from the oxidization electric potential of the water, and further, the lower level of the conduction band of the silicon is disposed on a negative side from the hydrogen reduction electric potential. Thus, the oxygen is generated from the water using the hole, and the hydrogen is generated from the water using the electron. Accordingly, the band gap is narrowed so that the optical energy is effectively absorbed, and the oxygen and the hydrogen are surely generated in the semiconductor photocatalyst. Thus, the artificial photonic synthesis device having the semiconductor photocatalyst according to the present embodiment has similar effects to the first embodiment.

Further, in the present embodiment, the casing 3 of the artificial photonic synthesis device is partitioned into the first casing 3a and the second casing 3b with the electrolyte film 6. The oxygen and the hydrogen are produced in different casings, respectively. Thus, the oxygen and the hydrogen are produced separately, so that the oxygen and the hydrogen are independently collected, and stored in different tanks. Further, a possibility of mixture of the hydrogen and the oxygen is reduced.

In the present embodiment, since the catalyst promoting material is added to the backside of the silicon layer 1 and/or the surface of the 3C—SiC layer 2, the optical energy is absorbed effectively and the hydrogen and the oxygen are effectively produced.

Third Embodiment

A third embodiment will be explained. In the present embodiment, the construction of the silicon layer 1 is different from the first embodiment.

Figure 5:
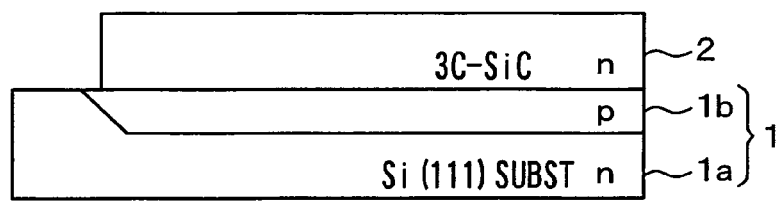
FIG. 5 is a diagram showing a cross sectional view of a semiconductor photocatalyst according to a third embodiment.
Figure 6:
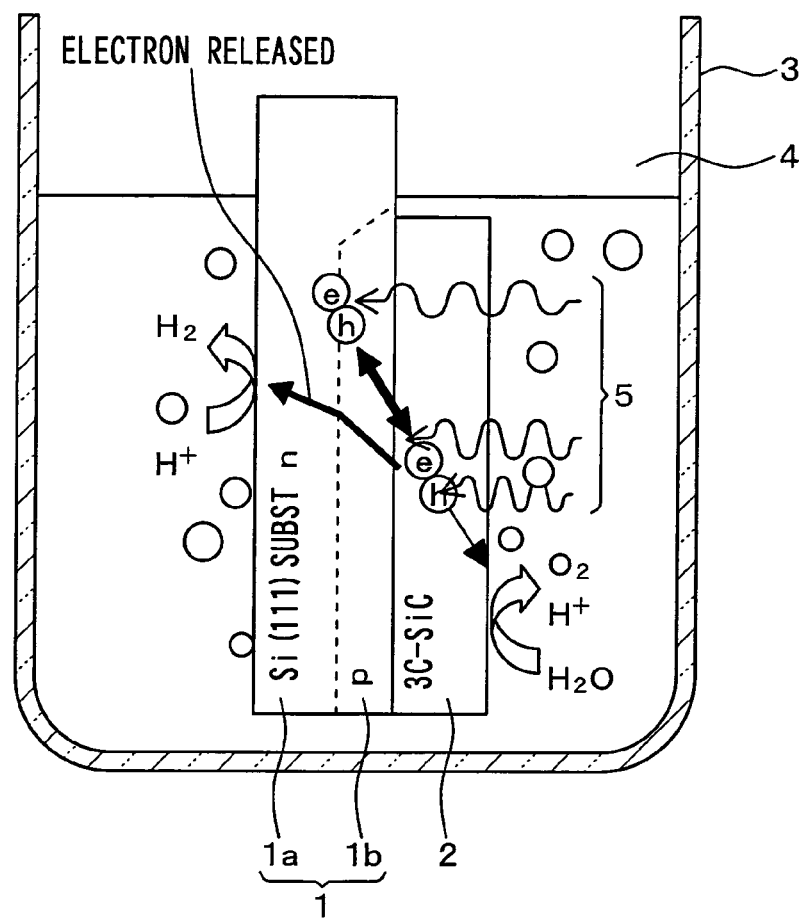
FIG. 6 is a diagram showing a cross sectional view of an artificial photonic synthesis device having the semiconductor photocatalyst shown in FIG. 5.

As shown in FIGS. 5 and 6, in the present embodiment, the silicon layer 1 is prepared such that the P conductive type layer 1b is formed in a surface portion of the N conductive type layer 1a. The P conductive type layer 1b is arranged on the 3C—SiC layer side, and the N conductive type layer 1a is arranged on a side opposite to the 3C—SiC layer 2. Thus, the silicon layer 1 includes the N conductive type layer 1a and the P conductive type layer 1b so that the PN junction is formed. The carriers are separated by an inner electric field of the PN junction. Further, the energy level of the electron is raised as an inner bias of the PN junction solar cell.

Figure 7:
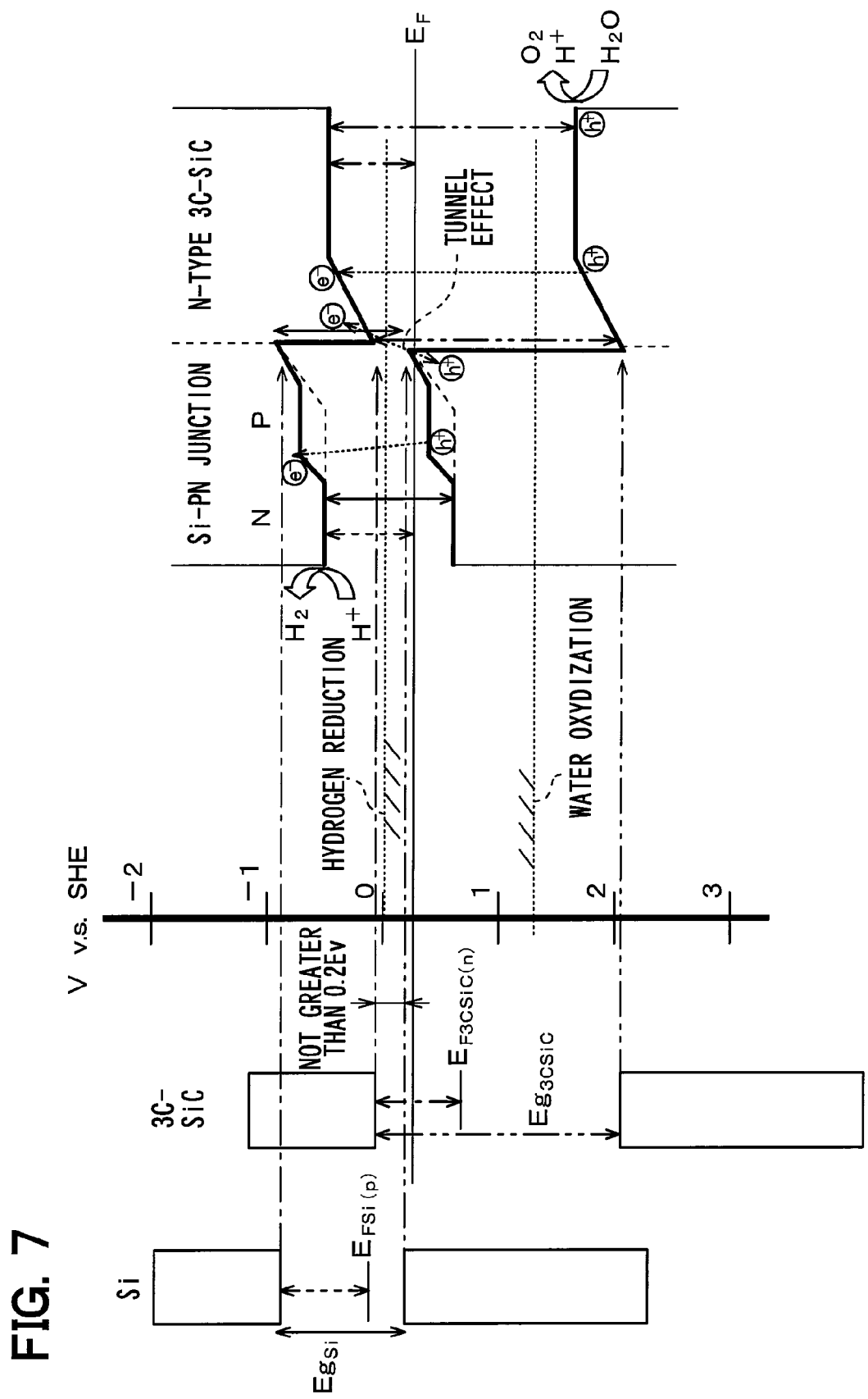
FIG. 7 is a diagram showing, with respect to the semiconductor photocatalyst in FIG. 5, an electric potential, an oxidation electric potential of water and a hydrogen reduction electric potential measured on the basis of the standard hydrogen electrode, an energy band structure of each of the silicon layer and a 3C—SiC layer, and an energy band structure in a case where the silicon layer and the 3C—SiC layer are bonded with a hetero junction.

Thus, the silicon layer 1 includes the N conductive type layer 1a in addition to the P conductive type layer 1b. Thus, when the sun light is irradiated, the electron gathered at the hetero junction on the 3C—SiC layer side and the hole gathered at the hetero junction on the P conductive type layer side are re-coupled by the tunnel phenomenon. Further, the electron is easily separated to the N conductive type layer. Thus, since the PN junction is formed, as shown in FIG. 7, the electron and the hole are re-coupled at the hetero junction, and the re-coupling between the electron and the hole, which are excited on the silicon layer side, is reduced at the PN junction. Thus, the decreases caused by the reduction of the re-coupling are retrieved as current. Specifically, when the thickness of the N conductive type layer 1a is thinned, the electron is easily retrieved. Thus, the thickness of the N conductive type layer 1a is thinned in some cases.

Fourth Embodiment

A fourth embodiment will be explained. In the present embodiment, the construction of the anode electrode 10 according to the second embodiment is changed to the third embodiment.

Figure 8:
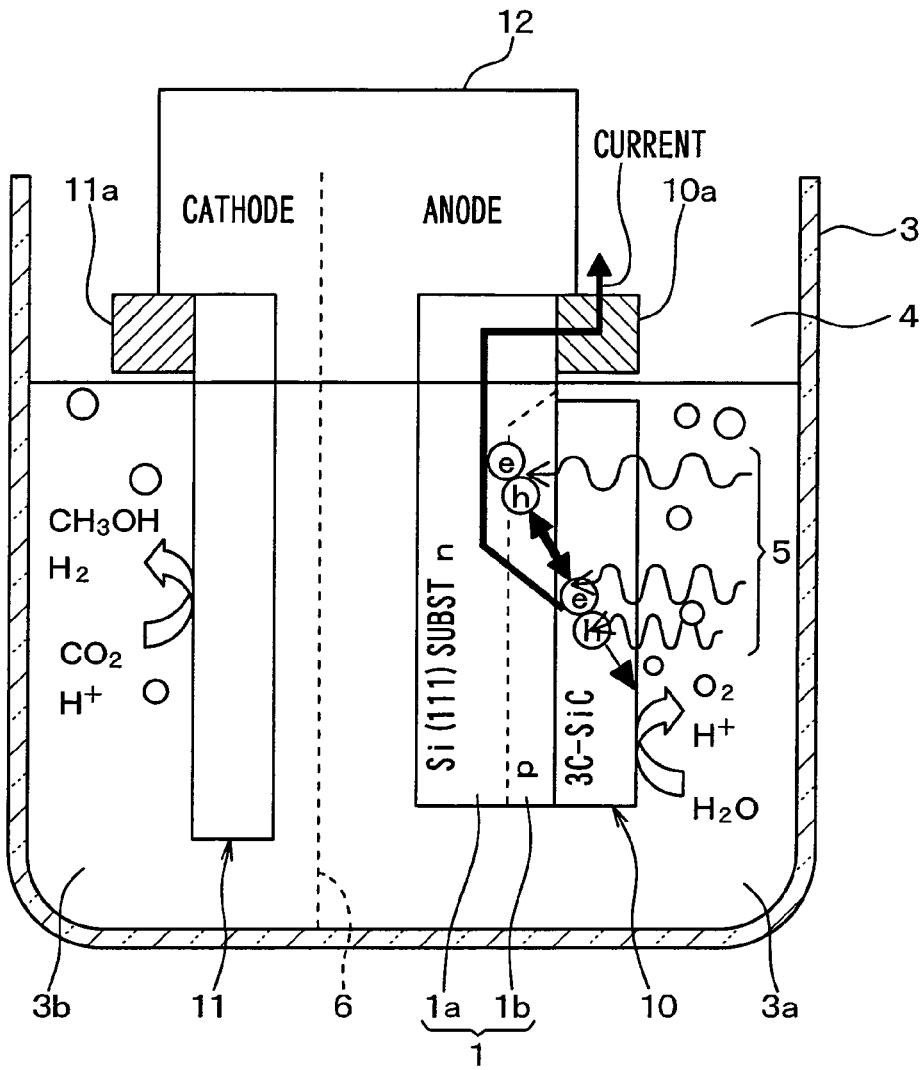
FIG. 8 is a diagram showing a cross sectional view of an artificial photonic synthesis device according to a fourth embodiment.

As shown in FIG. 8, in the present embodiment, the silicon layer 1 arranged in the anode electrode 10 is prepared such that the P conductive type layer 1b is formed in a surface portion of the N conductive type layer 1a. A part of the N conductive type layer 1a is exposed on a surface side, and the pad 10a is formed on an exposed surface.

Thus, the silicon layer 1 includes the N conductive type layer 1a and the P conductive type layer 1b so that the PN junction is formed. Further, the anode electrode 10 is prepared such that the 3C—SiC layer 2 is formed on the P conductive type layer 1b. This structure provides similar effects to the third embodiment. Further, the electron retrieved to the N conductive type layer side flows from the pad 10a formed on the surface side of the N conductive type layer 1a via the wiring 12 to the cathode electrode side 1. Accordingly, the current flows through only a part of the N conductive type layer 1a on the P conductive type layer side, so that the re-coupling between the electron and the hole is reduced at the PN junction. Even if the thickness of the N conductive type layer 1a is thick, the electron is easily retrieved as current.

Fifth Embodiment

A fifth embodiment will be explained as follows. In the present embodiment, the construction around the hetero junction is different from the first to fourth embodiments. In this embodiment, the construction around the hetero junction according to the first embodiment is modified. Alternatively, the construction around the hetero junction according to the second to fourth embodiment may be modified.

Figure 9:
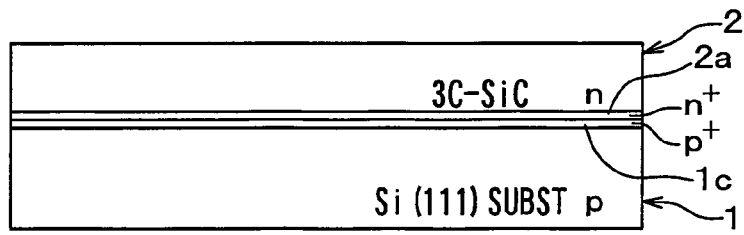
FIG. 9 is a diagram showing a cross sectional view of a semiconductor photocatalyst according to a fifth embodiment.

As shown in FIG. 9, in the present embodiment, a part of the first layer 1 having the P conductive type and disposed around the hetero junction provides a $P^+$ conductive type layer (i.e., a first high concentration layer) 1c, which has the impurity concentration higher than another part of the first layer 1 disposed apart from the hetero junction. Similarly, a part of the 3C—SiC layer 2 disposed around the hetero junction provides a $N^+$ conductive type layer (i.e., a second high concentration layer) 2a, which has the impurity concentration higher than another part of the 3C—SiC layer 2 disposed apart from the hetero junction. For example, the impurity concentration of the P+ conductive type layer 1c and/or the N+ conductive type layer 2a is equal to or higher than $1 \times 10^{20}$ $cm^{-3}$.

Figure 10:
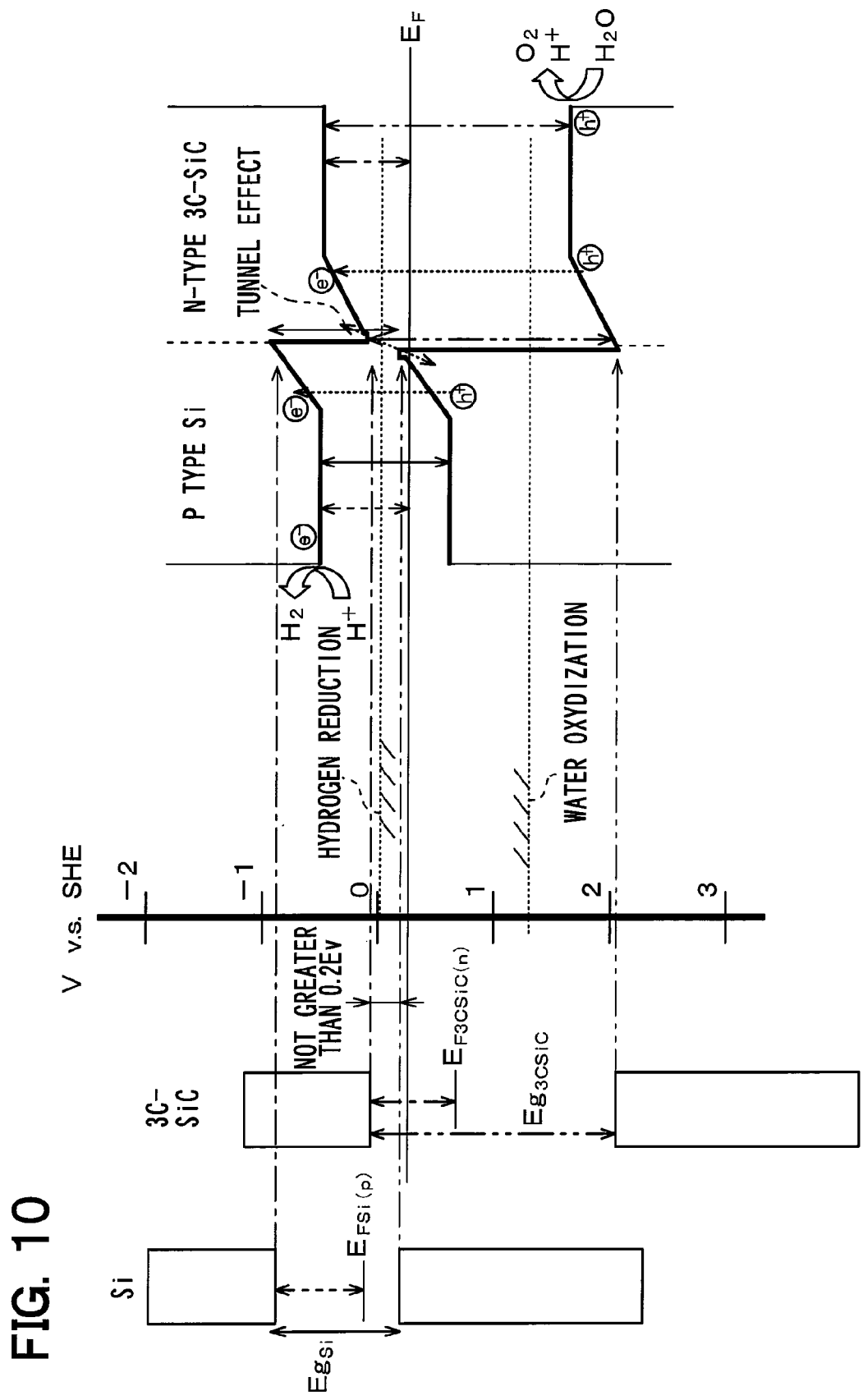
FIG. 10 is a diagram showing, with respect to the semiconductor photocatalyst in FIG. 9, an electric potential, an oxidation electric potential of water and a hydrogen reduction electric potential measured on the basis of the standard hydrogen electrode, an energy band structure of each of the silicon layer and a 3C—SiC layer, and an energy band structure in a case where the silicon layer and the 3C—SiC layer are bonded with a hetero junction.
Figure 11:
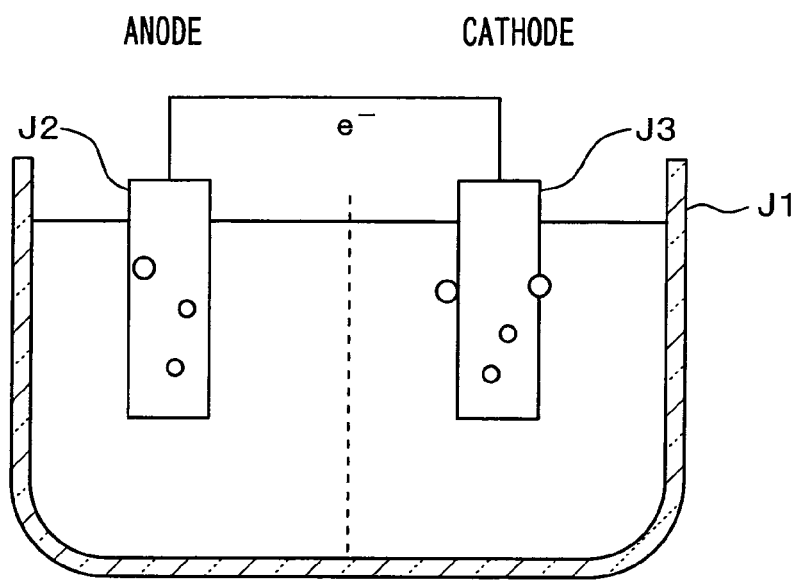
FIG. 11 is a diagram showing a cross sectional view of a feature in the artificial photosynthesis using the semiconductor photocatalyst.
Figure 12:
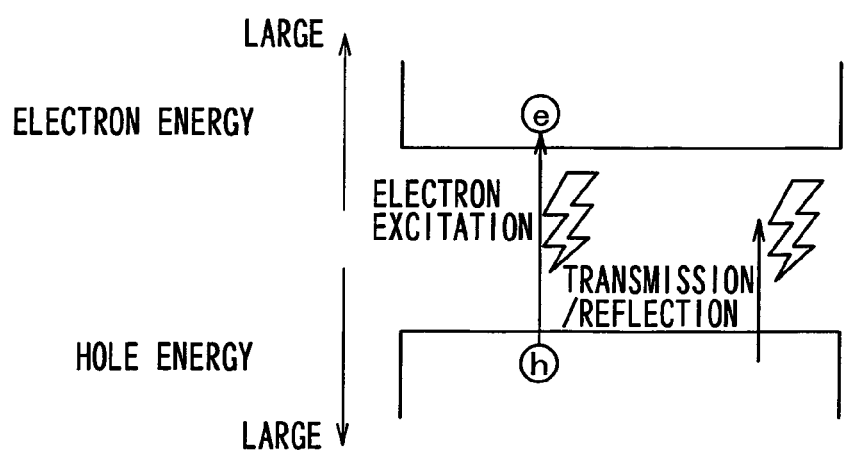
FIG. 12 is a diagram showing a feature of an energy band structure of general semiconductor and excitation of an electron with respect to sun light irradiation.
Figure 13:
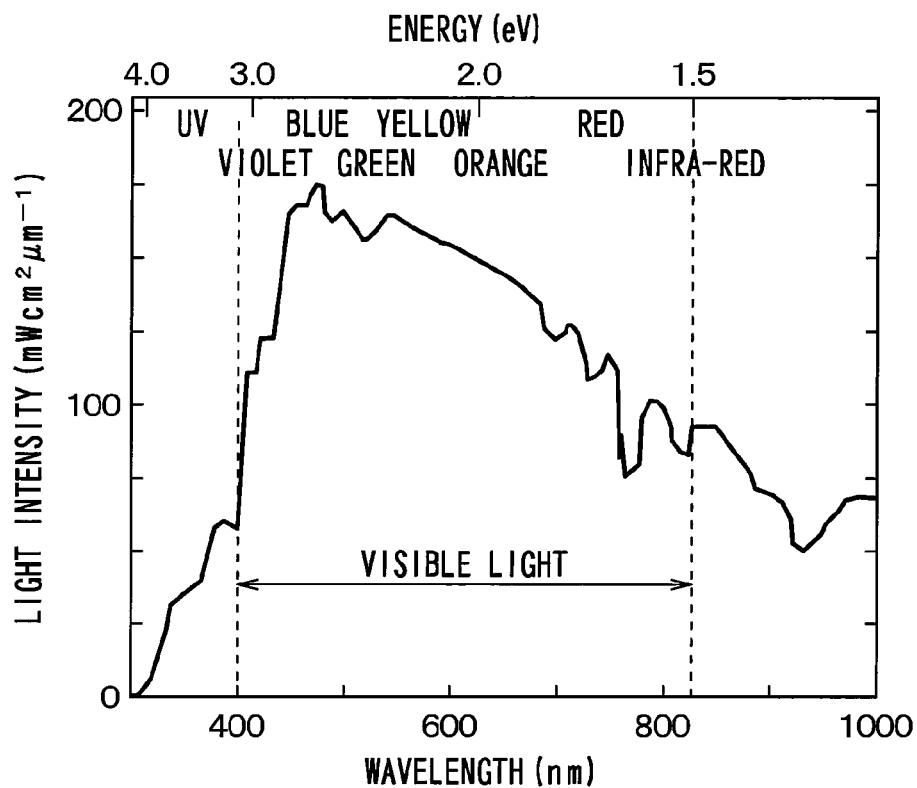
FIG. 13 is a diagram showing a relationship between the wavelength of the sun light and the light intensity.
Figure 14:
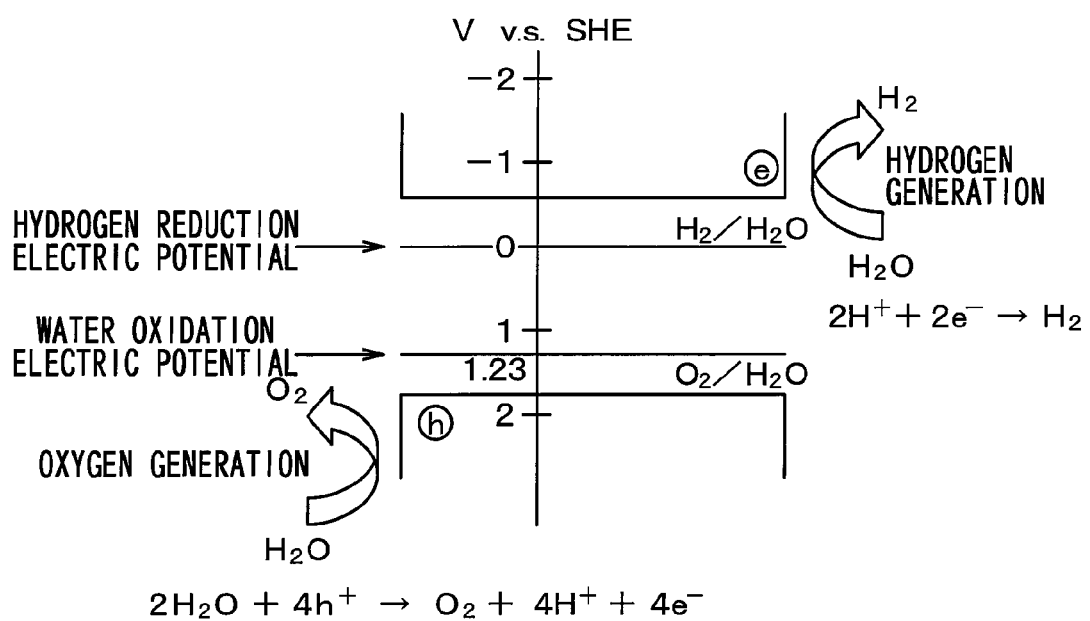
FIG. 14 is a diagram showing an energy band structure of a relationship between the oxidation electric potential of water required for generating oxygen from water using a hole and the hydrogen reduction electric potential required for generating hydrogen using an electron.

In the above case, as shown in FIG. 10, the band structure near the hetero junction is bent, so that the lower level of the conduction band of the 3C—SiC layer 2 protrudes downward, and the upper level of the valence band of the silicon layer 1 protrudes upward. Specifically, the density of state in the electron of the conduction band in the 3C—SiC layer 2 and the density of state in the valence band of the hole in the silicon layer 1 increase, and further, the thickness of the tunnel region is thinned. Thus, the electron in the conduction band of the 3C—SiC layer 2 and the hole in the valence band of the silicon layer 1 are easily re-coupled by the tunnel phenomenon. Thus, the effects according to each of the embodiments are easily obtained.

Other Embodiments

In each embodiment, the silicon layer 1 made of a first semiconductor material provides a first layer, and the 3C—SiC layer 2 made of a second semiconductor material provides a second layer. The first and second semiconductors may be other materials. For example, the first semiconductor material has a band gap larger than the second semiconductor material. Specifically, for example, the band gap of the second semiconductor material is equal to or smaller than 2.5 eV, which provides to absorb only a part of the wavelength of a visible light, and the band gap of the first semiconductor material is equal to or smaller than 1.5 eV, which provides to absorb the wider wavelength of a visible light than the second semiconductor material. Alternatively, the second layer may be made of other materials having the band gap equal to or smaller than 2.5 eV, instead of the second semiconductor material.

For example, the first layer may be made of gallium antimony (i.e., GaSb), indium phosphorus (InP), or the like. The second layer may be made of semiconductor material such as 3C—SiC and indium nitride (InN). Materials other than semiconductor for substituting the second semiconductor material are metal oxide or metal nitride such as tungsten oxide ($WO_3$).

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A semiconductor photocatalyst comprising:
   a first layer made of a first material having a band gap equal to or smaller than 1.5 eV; and
   a second layer made of a second material having a band gap equal to or smaller than 2.5 eV, wherein
   the band gap of the second material is larger than the first material,
   a lower electric potential of a conduction band of the second material is disposed on a positive side from a lower electric potential of a conduction band of the first material,
   an upper electric potential of a valence band of the second material is disposed on a positive side from an upper electric potential of a valence band of the first material,
   the first layer and the second layer are bonded to each other in a hetero junction manner,
   the upper electric potential of the valence band of the second layer is disposed on a positive side from an oxidation electric potential of water under a condition that the first layer and the second layer are bonded to each other in the hetero junction manner,
   the lower electric potential of the conduction band of the first layer is disposed on a negative side from a reduction electric potential of hydrogen under a condition that the first layer and the second layer are bonded to each other in the hetero junction manner,
   the conduction band of the first material is bent to the negative side toward a hetero junction,
   the valence band of the first material is bent to the negative side toward the hetero junction,
   the conduction band of the second material is bent to the positive side toward the hetero junction, and
   the valence band of the second material is bent to the positive side toward the hetero junction.

2. The semiconductor photocatalyst according to claim 1, wherein the first material is a first semiconductor material having a P conductive type,
   wherein the second material is a second semiconductor material having a N conductive type, and
   wherein the hetero junction between the first layer and the second layer provides a tunnel diode.

3. The semiconductor photocatalyst according to claim 2, wherein the first layer includes a first high impurity concentration layer, which is disposed on the hetero junction side,
   wherein the first high impurity concentration layer has an impurity concentration higher than a part of the first layer disposed apart from the hetero junction,
   wherein the second layer includes a second high impurity concentration layer, which is disposed on the hetero junction side, and
   wherein the second high impurity concentration layer has an impurity concentration higher than a part of the second layer disposed apart from the hetero junction.

4. The semiconductor photocatalyst according to claim 1, wherein the first layer includes a N conductive type layer and a P conductive type layer, which provide a PN junction,
   wherein the P conductive type layer is disposed on a second layer side, and
   wherein the N conductive type layer is disposed on a side opposite to the second layer side.

5. The semiconductor photocatalyst according to claim 1, wherein
   the first material is silicon, and
   the second material is 3C—SiC.

6. The semiconductor photocatalyst according to claim 5, wherein
   the first layer of silicon has a 111-plane surface in which the silicon has a 111-plane orientation crystal structure located at the hetero junction between the silicon of the first layer and the 3C—SiC of the second layer.

7. The semiconductor photocatalyst according to claim 1, further comprising:
   a catalyst promoting material arranged on at least one of the first layer and the second layer, wherein
   the catalyst is made of nickel oxide, rhodium oxide, ruthenium oxide, cobalt oxide, iridium oxide, or platinum.

8. The semiconductor photocatalyst according to claim 1, wherein
   the first layer includes an N conductive type layer and a P conductive type layer,
   the P conductive type layer is bonded to the second layer, and
   a part of the N conductive type layer is exposed to an external environment.

9. The semiconductor photocatalyst according to claim 1, wherein
   the first layer includes an N conductive type layer, a P conductive type layer, and a PN junction formed between the N conductive type layer and the P conductive type layer,
   the conduction band of the first material is bent in the negative direction towards both the PN junction formed between the N conductive type layer and the P conductive type layer and the hetero junction between the first material and the second material, and the valence band of the first material is bent in the negative direction towards both the PN junction formed between the N conductive type layer and the P conductive type layer and the hetero junction between the first material and the second material.

10. The semiconductor photocatalyst according to claim 1, wherein
a bandgap between the conduction band of the second material and the valance band of the first material at the hetero junction is equal to, or less than, 0.2 eV.

11. An artificial photonic synthesis device comprising:
a semiconductor photocatalyst according to claim 1; and
a casing that accommodates water, in which the semiconductor photocatalyst is dipped,
wherein, when a sun light is irradiated on the semiconductor photocatalyst from a second layer side, the photocatalyst promotes to produce oxygen and hydrogen using the water, or produce carbon hydride using the water and carbon dioxide.

12. The artificial photonic synthesis device according to claim 11, further comprising:
an anode electrode including the first layer and the second layer, which are arranged in the semiconductor photocatalyst;
a cathode electrode electrically connected to the first layer in the anode electrode;
a wiring electrically connecting the anode electrode and the cathode electrode; and
an electrolyte film that partitions the casing into a first casing and a second casing,
wherein the first casing accommodates the anode electrode,
wherein the second casing accommodates the cathode electrode,
wherein the oxygen is produced on the anode electrode, and
wherein at least one of the hydrogen or the carbon hydride is produced on the cathode electrode.

13. An artificial photonic synthesis device comprising:
a semiconductor photocatalyst according to claim 4;
a casing that accommodates water, in which the semiconductor photocatalyst is dipped;
an anode electrode including the first layer and the second layer, which are arranged in the semiconductor photocatalyst;
a cathode electrode electrically connected to the first layer in the anode electrode;
a wiring electrically connecting the anode electrode and the cathode electrode; and
an electrolyte film that partitions the casing into a first casing and a second casing,
wherein the first layer includes a N conductive type layer and a P conductive type layer, which provide a PN junction,
wherein the P conductive type layer is disposed on a second layer side,
wherein the N conductive type layer is disposed on a side opposite to the second layer side,
wherein the first casing accommodates the anode electrode,
wherein the second casing accommodates the cathode electrode,
wherein, when a sun light is irradiated on the anode electrode from a second layer side, the oxygen is produced on the anode electrode using the water, and at least one of the hydrogen or the carbon hydride is produced on the cathode electrode using the water and carbon dioxide.

14. The artificial photonic synthesis device according to claim 13, further comprising:
a pad,
wherein the P conductive type layer is disposed in a surface portion of the first layer on a second layer side,
wherein a part of the N conductive type layer is exposed on a surface of the first layer, which is arranged on a second layer side,
wherein the pad is arranged on an exposed part of the N conductive type layer, and wherein the wiring is electrically connected to the pad.

* * * * *